3,336,254
FLOOR TILE BINDER COMPRISING ATACTIC POLYPROPYLENE AND UNSATURATED RUBBER

Roy A. White, Somers, Conn., assignor, by mesne assignments, to Mobil Oil Corporation, a corporation of New York
No Drawing. Filed Feb. 15, 1963, Ser. No. 258,886
4 Claims. (Cl. 260—41)

This invention relates to floor covering compositions. It is more particularly concerned with floor tiles and the like having a novel elastomeric binder.

Floor tiles have become increasingly popular as floor coverings. Such tiles are characterized by toughness, hardness, and durability. It is also important that the binder used should be relatively inexpensive. Accordingly, low-cost rubber and vinyl resins have been proposed as binders in floor tile compositions.

It has now been discovered that tough, hard floor tile compositions can be made using a binder composite of atactic polypropylene and a minor amount of unsaturated elastomer.

Accordingly, it is a broad object of this invention to provide novel floor covreing compositions. Another object is to provide tough, hard floor tiles and the like. A specific object is to provide a floor tile composition having a novel binder. Another specific object is to provide a floor tile composition having a binder composite of atactic polypropylene and a minor amount of unsaturated elastomer. Other objects and advantages of this invention will become apparent to those skilled in the art from the following detailed description.

In general, this invention provides a floor tile molding composition that comprises, by weight:

|  | Parts |
|---|---|
| Atactic polypropylene | 100 |
| Unsaturated elastomer | 2–10 |
| Filling agents and pigments | 150–250 |
| Fibrous matter | 25–75 |
| Sulfur | 0.1–3 |
| Vulcanizing accelerators | 0–10 |
| Peroxides | 1–10 |
| Filler adhesion promoters | 0–4 |

The invention also provides molded floor tiles produced from the aforedescribed molding composition.

The atactic polypropylene used in the floor tile compositions of this invention is a non-crystalline, elastomeric linear polymer of propylene, in which there is complete randomness with regard to the configurations at all the main chain sites of steric isomerism. In other words it is characterized by having methyl groups attached to the main polymer chain, which are randomly located above and below the plane of the main polymer chain. Preferably, the atactic polypropylene should have a molecular weight of at least about 10,000. It can be prepared by several catalytic methods well known in the art and is commercially available.

The unsaturated elastomer component, which is essential in the floor tile composition, can be natural rubber or a synthetic rubber, such as SBR type rubber (butadiene-styrene rubber). Non-limiting examples of other utilizable synthetic rubbers include butyl rubber (isobutylene polymerized with small amounts of isoprene), cis-1, 4-polybutadiene, 1,2-polybutadiene-styrene copolymer, butadiene-styrene-acrylonitrile terpolymers, and butadiene-vinyl pyridine rubber. The methods for producing these rubbers are well known to those familiar with the art. The manner by which the rubber is prepared is not a limiting factor in this invention. Indeed, many unsaturated rubbers are available commercially and are contemplated.

The amount of unsaturated rubber used in the floor tile composition of this invention is relatively small. Ordinarily between about 2 parts and about 10 parts per 100 parts polypropylene, by weight, are employed.

One or more fillers are used in the present floor tile compositions to create bulk, and increase hardness and resistance to indentation, heat, water, and chemicals. Non-limiting examples of fillers that are utilizable are graphite, diatomite, clays, quartz, sand, metal powder, metal oxides, calcium carbonate and the like, wood flour, marble flour, sawdust, mica, ground cork, wood pulp, walnut shell flour, and chalk. For the general purpose of enhancing appearance, pigments can be included in the floor tile composition. Some materials, such as metal oxides, which are classed as fillers, are also pigments. Accordingly, within the contemplation of this invention, the filler content of the composition can include, at least in part, pigments. The pigments can be inorganic or organic materials that are insoluble in the resin and elastomer. As is well known in the art, pigments are obtained from numerous sources, including salts, metal oxides, azo compounds, nitro compounds, anthroquinones, and indigos. Typical pigments include lithopone, titanium dioxide, zinc oxide burnt sienna, ferric oxide, red lead, raw umber, yellow ocher, lead chromate, chrome orange, chrome green, ultramraine blue, Pigment Chlorine GG, Lithol Fast Yellow GG, Toluidine Red R, o-Chloronitroaniline Red, Orange GG, Yellow R, Benzidine Yellow, Malachite Green, Methyl Violet B, Rhodamine B, Lake Red D, Naphthol Green B, and Alizarin. Many other pigments are well known in the art and are contemplated herein. The total amount of filler or fillers including pigments, will be, in general, between about 150 parts and about 250 parts per 100 parts polypropylene, by weight.

For purposes of strengthening and reinforcing the floor tile and enhancing dimensional stability and impact strength, fibers are included. Typical fibers that can be used are wood fibers, cotton fibers, glass fibers, hemp, asbestos, wood pulp, and synthetic fibers, such as nylon, Orlon, Dacron and the like. The amount of fibrous matter included in the floor tile composition will be between about 25 parts and about 75 parts per 100 parts polypropylene, by weight.

In order to promote cross-linking of the atactic polypropylene and synthetic rubber, sulfur or sulfur-containing cross-linking agents are employed in small amounts. Generally, the amount of sulfur added, as such or in a sulfur compound, will be between about 0.1 part and about 3 parts per 100 parts polypropylene, by weight.

Vulcanization and cross-linking can be initiated by vulcanizing accelerators. Suitable accelerators are diallyl phthalate, p-quinone dioxime, benzothiazyl disulfide, zinc dibutyl dithiocarbamate, butyraldehyde-aniline condensation product, dibutyl thiourea, and 2-mercaptobenzothiazole. It is within the contemplation of this invention to use more than one accelerator. The total amount of accelerator will be between about O part and about 10 parts, preferably 2–5 parts per 100 parts polypropylene, by weight.

Peroxides such as 2,5-dimethyl-2,5-di(t-butylperoxy) hexyne-3, 2,5-dimethyl-2,5-di(t-butylperoxy) hexane, dicumyl peroxide, di-t-butyl peroxide, benzoyl peroxide, and dichlorobenzoyl peroxide are used to assist cross-linking. These peroxides when used by themselves can form peroxide groups on polymer chains, which in turn attack other chains, causing cross-linking. When used in conjunction with sulfur, the peroxides' principal use may be to dehydrogenate the polymer chain and cause unsaturation. Peroxides in amounts of between about 1 part and about 10 parts can be used, per 100 parts polypropylene, by weight.

Filler adhesion promoters are reagents which promote a chemical bond between the filler and the elastomer, permitting the filler to act as a reinforcing agent. Typical examples are N-methyl-N, p-dinitroso aniline and polyalkanol polyamines. The amount used can be between 0–4 parts per 100 parts polypropylene, by weight.

The ingredients are first blended by masticating, for example on a slightly warm differential-speed 2-roll mill.

The molding composition, described hereinbefore, is then molded and cured at elevated temperatures for a time sufficient to effect sufficient vulcanization and to form the tile. Generally, the molding temperature will be between about 250° F. and about 360° F. The time of molding and curing can vary between about 15 minutes and about 90 minutes. Normal molding pressures of 100–10,000 p.s.i. are used to make the composition flow together and form a smooth surface.

The molding composition of this invention has been described with particular reference to floor tiles. Such tiles can be molded into various shapes and sizes, including the usual 9 in. x 9 in. tile. The composition can be molded into sheets. Such sheets can be used to cover large areas of floor surface. It is also within the contemplation of this invention to use the molded sheets for other applications wherein hardness and strength are desired. Thus, for example, they can be used for covering tables, counter tops, and the like.

*Example 1*

A mixture was prepared containing 100 parts (all parts are by weight) atactic polypropylene (M.W.=10,000), 4 parts SBR rubber, 100 parts calcium carbonate (15 microns or less particle size), 100 parts 325 mesh kaolin hard clay, 50 parts asbestos fibers, 1.2 parts N-methyl-N, p-dinitroso aniline, 1.2 parts sulfur, and 4 parts 50% dimethyl di(t-butylperoxy) hexyne. This mixture was blended on a differential-speed 2-roll mill at slightly above room temperature and then molded into a floor tile at 177° C. for 30 minutes. The tile thus formed had a Shore Durometer hardness (ASTM D1706–59T) on Type A of 99 and on Type D of 60. It had tensile strength of 1150 p.s.i.g. and an elongation of 35% (ASTM D368–60T).

It will be noted that this floor tile had good properties of hardness and tensile strength. When the small amount of synthetic rubber is not used, such properties are not achieved. This will be apparent from the following example.

*Example 2*

A mixture was prepared containing 100 parts (all parts are by weight) atactic polypropylene (M.W.=10,000), 100 parts calcium carbonate (15 microns or less particle size), 100 parts 325 mesh kaolin hard clay, 50 parts asbestos fibers, 1.2 parts sulfur, and 8 parts 50% dimethyl di(t-butylperoxy)-hexyne. This mixture was blended on a differential-speed 2-roll mill at slightly above room temperature and then molded into a tile at 177° C. for 20 minutes. This tile had a Shore Durometer A Hardness of 92, tensile strength of 594 p.s.i.g., and elongation of 100%.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A floor tile molding composition that comprises, by weight (molecular weight at least 10,000):

| | Parts |
|---|---|
| Atactic polypropylene | 100 |
| Unsaturated rubber | 2–10 |
| Filling agents and pigments | 150–250 |
| Fibrous matter | 25–75 |
| Sulfur | 0.1–3 |
| Peroxides | 1–10 |

2. A floor tile molding composition that comprises, by weight (molecular weight at least 10,000):

| | Parts |
|---|---|
| Atactic polypropylene | 100 |
| Styrene butadiene rubber | 4 |
| Calcium carbonate | 100 |
| Kaolin | 100 |
| Asbestos | 50 |
| Dimethyl di(t-butylperoxy)hexyne | 4 |

3. The floor covering composition produced by molding and curing the molding composition defined in claim 1.

4. The floor covering composition produced by molding and curing the molding composition defined in claim 2.

References Cited

UNITED STATES PATENTS

| 2,916,481 | 12/1959 | Gilmont | 260—41 |
| 2,939,860 | 6/1960 | Schramm | 260—45.5 |
| 3,018,263 | 1/1962 | Schneider | 260—45.5 |
| 3,240,727 | 3/1966 | Scalari et al. | 260—2.5 |

FOREIGN PATENTS 884,723   12/1961   Great Britain.

OTHER REFERENCES

Installation and Maintenance of Resilient Smooth-Surface Flooring, National Academy of Sciences-National Research Council (NAS-NRC 597), Washington, D.C., September 1958, pp. 92–93.

MORRIS LIEBMAN, *Primary Examiner.*

K. B. CLARKE, J. H. DERRINGTON,

*Assistant Examiners.*

UNITED STATES PATENT OFFICE
CERTIFICATE OF CORRECTION

Patent No. 3,336,254                                    August 15, 1967

Roy A. White

It is hereby certified that error appears in the above numbered patent requiring correction and that the said Letters Patent should read as corrected below.

Column 4, lines 14 and 23, strike out "(molecular weight at least 10,000)", each occurrence and insert the same after "Atactic polypropylene", each occurrence, in lines 16 and 25, same column 4.

Signed and sealed this 13th day of August 1968.

(SEAL)
Attest:

Edward M. Fletcher, Jr.                                EDWARD J. BRENNER
Attesting Officer                                           Commissioner of Patents